(12) United States Patent
Puppe et al.

(10) Patent No.: US 12,266,901 B2
(45) Date of Patent: Apr. 1, 2025

(54) LASER DEVICE FOR GENERATING AN OPTICAL FREQUENCY COMB

(71) Applicant: TOPTICA Photonics AG, Gräfelfing (DE)

(72) Inventors: Thomas A. Puppe, Munich (DE); Christoph Tresp, Munich (DE); Max Eisele, Krailling (DE); Christoph Skrobol, Munich (DE)

(73) Assignee: Toptica Photonics AG, Gräfelfing (DE)

( * ) Notice: Subject to any disclaimer, the term of this patent is extended or adjusted under 35 U.S.C. 154(b) by 0 days.

(21) Appl. No.: 17/956,578

(22) Filed: Sep. 29, 2022

(65) Prior Publication Data

US 2023/0014323 A1 Jan. 19, 2023

Related U.S. Application Data

(63) Continuation of application No. 16/698,159, filed on Nov. 27, 2019.

(51) Int. Cl.
*H01S 3/137* (2006.01)
*H01S 3/00* (2006.01)
(Continued)

(52) U.S. Cl.
CPC ............ *H01S 3/137* (2013.01); *H01S 3/0085* (2013.01); *H01S 3/1106* (2013.01); *H01S 3/1307* (2013.01); *H01S 3/08059* (2013.01)

(58) Field of Classification Search
CPC ....... H01S 3/1106–1121; H01S 3/0085; H01S 3/1307
See application file for complete search history.

(56) References Cited

U.S. PATENT DOCUMENTS 3,995,231 A * 11/1976 Johnson ................. H01S 3/1109
372/18
6,038,055 A * 3/2000 Hansch ................. H01S 3/082
359/264
(Continued)

FOREIGN PATENT DOCUMENTS

CN 109031852 A * 12/2018
CN 109217090 A * 1/2019
(Continued)

*Primary Examiner* — Joshua King
(74) *Attorney, Agent, or Firm* — Adams and Reese LLP; John Henry Scott, III

(57) ABSTRACT

The invention relates to a laser device comprising a laser source (1), which is configured to emit pulsed laser radiation (2) with a spectrum in the form of a frequency comb having a plurality of equidistant spectral lines, an optical modulator (3), which is configured to shift the frequency of the laser radiation (2), and a control unit (10), which is configured to control the modulator (3) by means of a control signal (6). It is the object of the present invention to demonstrate an improved way, compared to the prior art, of generating an optical frequency comb that is stabilized in terms of the CEO frequency, in which the CE phase is also adjustable. To this end, the invention proposes that the laser radiation (2) emitted by the laser source (1) is stabilized in terms of the carrier-envelope frequency. Furthermore, the invention relates to a method of generating an optical frequency comb.

10 Claims, 3 Drawing Sheets

Figure 1:
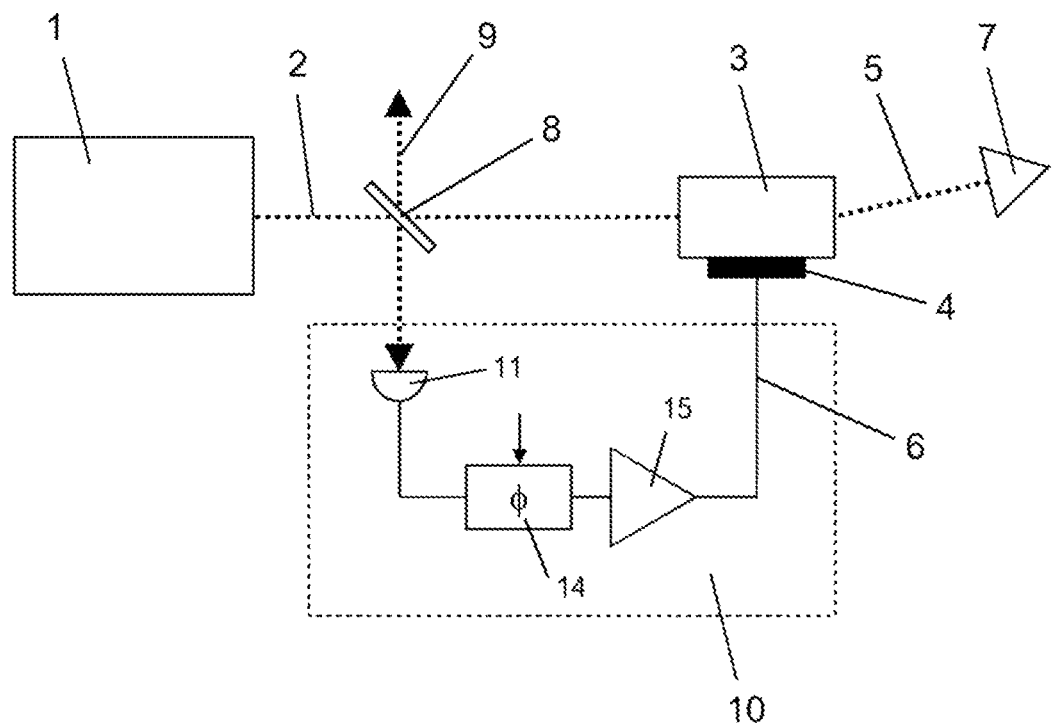

(51) Int. Cl.
*H01S 3/08* (2023.01)
*H01S 3/1106* (2023.01)
*H01S 3/13* (2006.01)

(56) References Cited

U.S. PATENT DOCUMENTS

| | | | | |
|---|---|---|---|---|
| 6,654,394 | B1* | 11/2003 | Sellin | H01S 5/0687 372/26 |
| 6,724,788 | B1* | 4/2004 | Holzwarth | G02F 1/3534 372/21 |
| 6,785,303 | B1* | 8/2004 | Holzwarth | H01S 3/1112 372/100 |
| 7,804,863 | B2* | 9/2010 | Adel | H01S 3/06754 372/3 |
| 10,784,643 | B2* | 9/2020 | De Vries | H01S 3/0057 |
| 2006/0039419 | A1* | 2/2006 | Deshi | H01S 3/1106 372/9 |
| 2009/0284828 | A1* | 11/2009 | Sosabowski | H01S 3/1115 359/326 |
| 2010/0040097 | A1* | 2/2010 | Verhoef | H01S 3/1301 372/25 |
| 2010/0265972 | A1* | 10/2010 | Hartl | G02F 1/365 372/18 |
| 2011/0235661 | A1* | 9/2011 | Grebing | G02F 1/33 372/23 |
| 2013/0003766 | A1* | 1/2013 | Savchenkov | G04F 5/14 372/38.01 |
| 2013/0034114 | A1* | 2/2013 | Schill | H01S 3/1305 372/18 |
| 2013/0272328 | A1* | 10/2013 | Gobert | H01S 3/0057 372/30 |
| 2014/0185635 | A1* | 7/2014 | Cox | H01S 3/1305 372/18 |
| 2014/0186045 | A1* | 7/2014 | Poddar | H03B 17/00 398/115 |
| 2015/0303639 | A1* | 10/2015 | Zach | H01S 3/0085 359/259 |
| 2016/0226216 | A1* | 8/2016 | Schilt | H01S 3/1307 |
| 2016/0254646 | A1* | 9/2016 | Li | H01S 3/0627 372/32 |
| 2018/0041001 | A1* | 2/2018 | De Vries | H01S 3/1307 |

FOREIGN PATENT DOCUMENTS

| | | | | | |
|---|---|---|---|---|---|
| CN | 109346913 | A | * | 2/2019 | |
| DE | 102013209848 | B3 | * | 6/2014 | ........... H01S 3/1307 |
| DE | 102013219338 | A1 | * | 3/2015 | ........... H01S 3/1307 |
| DE | 102014226973 | A1 | * | 6/2016 | ......... H01S 3/08054 |
| DE | 102015200668 | A1 | * | 7/2016 | ........... H01S 3/0057 |
| DE | 102015104084 | A1 | * | 9/2016 | ............. G02F 1/113 |
| EP | 2515395 | A1 | * | 10/2012 | ......... G01N 21/3581 |
| JP | 07245443 | A | * | 9/1995 | ........... H01S 3/1109 |
| WO | WO-2009070849 | A1 | * | 6/2009 | ............. G01N 21/39 |
| WO | WO-2010063051 | A1 | * | 6/2010 | ............... G02F 1/33 |
| WO | WO-2016164263 | A1 | * | 10/2016 | ............. H03B 17/00 |
| WO | WO-2018129297 | A1 | * | 7/2018 | ........... H01S 3/1095 |

* cited by examiner

LASER DEVICE FOR GENERATING AN OPTICAL FREQUENCY COMB

CROSS-REFERENCE TO RELATED APPLICATION

This patent application claims benefit of U.S. patent application Ser. No. 16/698,159, filed Nov. 27, 2019, the contents of which are hereby incorporated by reference in its entirety.

The invention relates to a laser device comprising:
a laser source, which is configured to emit pulsed laser radiation with a spectrum in the form of a frequency comb having a plurality of equidistant spectral lines,
an optical modulator, which is configured to shift the phase and/or frequency of the laser radiation, and
a control unit, which is configured to control the modulator by means of a control signal.

Furthermore, the invention relates to a method of generating an optical frequency comb, comprising the steps of:
generating pulsed laser radiation having a spectrum in the form of a frequency comb with a plurality of equidistant spectral lines, and
shifting the phase and/or frequency of the laser radiation according to a control signal.

Optical frequency combs have attracted a great deal of attention for many years. A variety of possible applications exist, e.g. in precision spectroscopy and frequency metrology.

Ultrashort optical pulses in the pico- and femtosecond range can be generated using mode-locked lasers. The frequency spectrum of a regular pulse train, as emitted by a mode-locked laser, consists of equidistant discrete spectral lines. A spectrum of this type is known as a frequency comb. The individual spectral lines are very narrow compared to their spacing in the spectrum. Their spacing corresponds to the repetition frequency of the pulses, which is typically in the range of between 10 MHz and 10 GHz. This corresponds to pulse intervals of between 100 ns and 100 ps. The overall spectrum can be many THz wide. In these frequency combs generated by means of mode-locked lasers, however, it is not the case that the absolute frequencies of all the spectral lines are integer multiples, i.e. harmonics, of a fundamental frequency. This results from the fact that the electric carrier field of the laser radiation undergoes a change in phase from pulse to pulse with regard to the envelope of the pulses. The phase difference between the carrier wave and the intensity envelope of the individual pulse is referred to as a carrier-envelope phase (CE phase for short). The change in the CE phase from pulse to pulse is also referred to as CE phase slip. This results from the phase and group velocities of the laser pulses that circulate in the laser resonator, which velocities deviate from one another, and depends on various dispersive and non-linear effects in the laser. Because of the CE phase slip, the entire spectrum is shifted by a corresponding carrier-envelope-offset frequency (CEO frequency) as compared with the frequency origin. The frequencies of the individual spectral lines of the frequency comb are therefore obtained as the sum of the CEO frequency and an integer multiple of the pulse repetition frequency of the laser. The CEO frequency is very important in metrology, because the absolute frequencies fn of all the spectral lines are only clearly determined by the indication of the integer multiple n of the repetition rate df and of the CEO frequency fcEo:

$$fn = fcEo + n*df$$

Without special measures, the pulse repetition frequency df and the CEO frequency fcEO are subject to fluctuations due to external influences on the laser system (temperature, air pressure, pump power etc.). For most applications, therefore, both of these parameters have to be stabilized.

The pulse repetition frequency can be stabilized comparatively easily, e.g. by controlling the resonator length of the laser and thus the round-trip time of the laser pulses in the resonator. This can take place by means of suitable mechanical adjusting elements (e.g. by piezo actuator for adjusting the position of an end mirror in the resonator) and coupling the control to a frequency standard in the radio-frequency range.

The stabilizing of the CEO frequency is generally more complicated.

From DE 10 2004 022 037 A1 a laser device is known in which a difference-frequency generator is used to generate a CEO-free optical frequency comb. This difference-frequency generator converts the laser radiation of a mode-locked laser in such a way that spectral lines are generated, the frequency of which is in each case equal to the difference frequency of two spectral lines of the original radiation of the mode-locked laser. The CEO frequency is eliminated by subtraction, i.e. the carrier-envelope frequency equals zero (fcEo=0). The result is a CEO-free frequency comb, in which the frequencies of the spectral lines are clearly defined only by an integer multiple of the pulse repetition frequency of the mode-locked laser, since the CEO frequency assumes a value of zero:

$$fn = n*df$$

The radiation converted by difference frequency generation therefore again has the form of a frequency comb, wherein the frequencies of the spectral lines in the spectrum of the converted radiation are harmonics of the fundamental frequency df. The difference frequency generation thus brings about a passive stabilizing of the CEO frequency at zero. In principle, it is not possible to achieve other values of the CEO frequency using this known approach. This is disadvantageous with regard to some applications.

DE 10 2008 059 902 83 describes a method and a device for generating a self-referenced optical frequency comb. Here, a laser source first generates a frequency comb that is not stabilized in terms of the CEO frequency. Downstream of the laser source in the radiation path, there is an acousto-optic modulator as a frequency shifter. Part of the beam is coupled out of the unstabilised pulse train and supplied to a control unit. This comprises an f-2f interferometer, which generates a beat signal, the frequency of which is equal to the current CEO frequency of the laser radiation. The other part of the laser radiation passes through the acousto-optic modulator, of which the medium is excited by means of a radio-frequency control signal derived from the beat signal. This has the effect that all the spectral lines of the frequency comb are decremented in frequency by exactly the current CEO frequency. The result is thus, again, a CEO-free optical frequency comb which is thus stabilized in terms of fcEo. Furthermore, the above document proposes generating the control signal for controlling the acousto-optic modulator by mixing the beat signal of the f-2f interferometer with a radio-frequency offset frequency signal. This variant allows the CEO frequency to be stabilized at a value other than zero (corresponding to the offset frequency).

It is a disadvantage of this approach that the generation of the beat signal by an f-2f interferometer is comparatively complex. Furthermore, it has been shown that there is a need for optical frequency combs in which the CE phase can also be adjusted. The laser device known from the document cited above is not capable of this.

Against this background, it is the object of the present invention to demonstrate an improved way, compared to the prior art, of generating an optical frequency comb that is stabilized in terms of the CEO frequency, in which furthermore the CE phase can be adjusted.

This object is achieved by the invention starting from a laser device of the type mentioned above by the fact that the laser radiation emitted by the laser source is stabilized in terms of the carrier-envelope frequency (and optionally also in terms of the pulse repetition frequency).

Unlike the prior art, the approach of the present invention starts from a stabilized frequency comb. The finding of the invention is that a control signal for controlling the optical modulator can be derived from the stabilized laser pulse train very simply, and without the use of an f-2f interferometer, so that by frequency shifting the laser radiation in the optical modulator a stabilized frequency comb with a predefinable CEO frequency and/or predefinable CE phase again results.

The optical modulator of the laser device according to the invention is preferably an acousto-optic modulator, in the medium of which an acoustic wave is excited by the control signal. However, the invention can also be implemented using an electro-optic modulator (e.g. Pockels cell) or by means of a Mach-Zehnder modulator.

The control unit is expediently configured to generate the control signal as a radio-frequency signal at the pulse repetition frequency or an integer multiple thereof. In the simplest case, part of the laser pulse train is directed on to a photodiode, at the output of which an electrical signal at the pulse repetition frequency is then present. Alternatively, the control signal can be derived from the electronic control device of the laser source used for stabilizing the pulse repetition frequency. The control signal can be used directly (after suitable signal processing and/or amplification if appropriate) as a control signal for controlling the optical modulator. This accordingly shifts the frequency of the laser radiation, i.e. the frequency of each individual spectral line of the frequency comb, by the pulse repetition frequency (or an integer multiple thereof). The result is that the frequency comb is, as it were, transposed into itself. Each spectral line is frequency-shifted such that its position coincides with a spectral line of the original frequency comb.

If necessary, the control signal can be generated at a frequency that is shifted relative to the pulse repetition frequency (or an integer multiple thereof) by a correspondingly adjustable frequency offset, e.g. by mixing with an offset frequency signal having an adjustable frequency. Thus, the frequency comb is not transposed into itself. Instead, after passing through the modulator, the position of the spectral lines of the frequency comb deviates from the original position by a frequency corresponding to the frequency offset. In this way the CEO frequency can be flexibly adjusted to a desired value.

In a preferred embodiment, the control unit is further configured to set the phase of the control signal. The setting of the phase of the control signal causes a corresponding setting of the CE phase. The setting of the phase of the control signal by means of the control unit is simple to achieve, e.g. by means of a radio-frequency phase shifter. In this case, the phase setting of the control signal can take place from laser pulse to laser pulse, i.e. at the pulse repetition frequency. For example, the CE phase can be switched backwards and forwards between two or more values in time with the laser pulses. Likewise, the CE phase can be incremented from laser pulse to laser pulse by a predefinable value, which in turn amounts to a setting of the CEO frequency.

In a particularly preferred embodiment, the carrier-envelope frequency of the laser radiation emitted by the laser source (i.e. before passing through the modulator) equals zero. In this embodiment, an optical frequency comb that is passively stabilized in terms of fcEo by difference frequency generation can be used as a starting point in order to then adjust the desired CEO frequency and/or CE phase by the frequency shift according to the invention. As a laser source in the device according to the invention, for example, a system such as the one known from DE 10 2004 022 037 A1 cited above can thus be used. In combination with the frequency shift according to the invention, a completely stabilized optical frequency comb with predefinable (non-zero) CEO frequency and/or phase (modulo an initial phase if appropriate) can be achieved in this way, and without the need for f-2f interferometry.

In a possible embodiment, the laser source comprises a mode-locked oscillator, two separate radiation paths for the laser radiation emitted by the mode-locked oscillator, wherein the optical modulator is located in one of the two radiation paths, and a difference-frequency generator, in which the laser radiation supplied via the two radiation paths is superposed. In this embodiment, the optical modulator is not located downstream of the laser source (and sets the phase and/or frequency of the laser radiation that is stabilized in terms of the CEO frequency), but is integrated into the laser source. The pulsed laser radiation of the mode-locked oscillator is split into the two separate radiation paths (e.g. by a beam splitter), wherein the optical modulator is located in one of the radiation paths and thus only shifts the laser radiation propagating along this radiation path in terms of the phase and/or frequency. The laser radiation propagating along the two radiation paths is finally recombined and superposed in the difference-frequency generator. Here, the CEO frequency is stabilized as described above. However, the phase and/or frequency imprinted by the optical modulator in one of the two radiation paths is maintained in the difference-frequency generator in the laser radiation leaving the laser source, since only part of the laser radiation reaching the difference-frequency generator has been shifted in terms of phase and/or frequency. Thus, the optical modulator causes a phase and/or frequency adjustment of the laser radiation that is stabilized in terms of the CEO frequency, although it is located at a point in the radiation path where the laser radiation is actually not yet stabilized in terms of fcEo.

The invention furthermore achieves the above object by a method of the type mentioned above, in which the generated laser radiation is stabilized in terms of the carrier-envelope frequency. In this case; the frequency of the laser radiation is expediently shifted by means of an optical modulator, in particular an acousto-optic modulator, specifically, as explained above, by the pulse repetition frequency or an integer multiple thereof or by a frequency that differs from the pulse repetition frequency or an integer multiple thereof by a frequency offset. The carrier-envelope phase of the laser radiation here can advantageously be adjusted by phase setting of the control signal, and specifically, if required by the application, from laser pulse to laser pulse.

Figure 2:
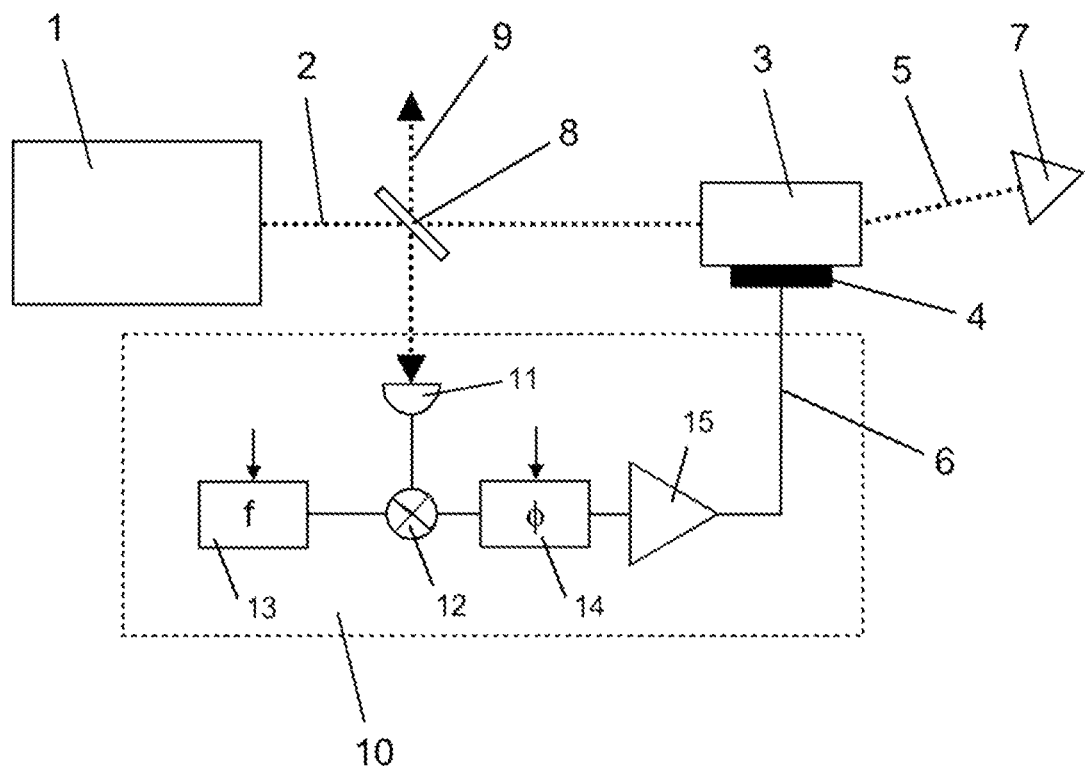
Figure 3:
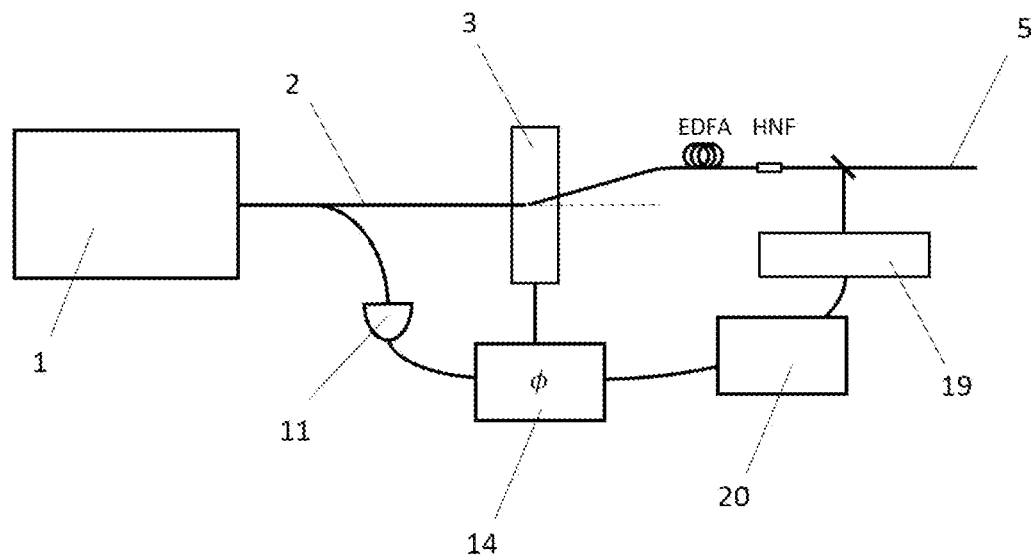
Figure 4:
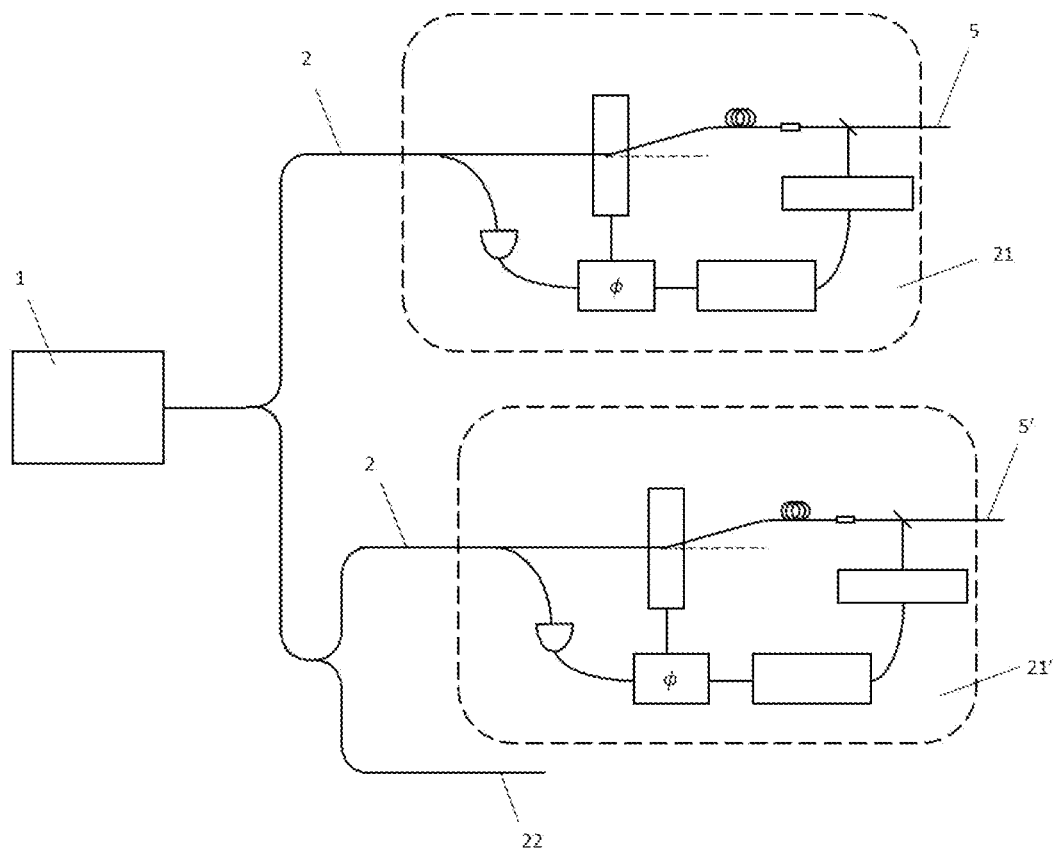
Figure 5:
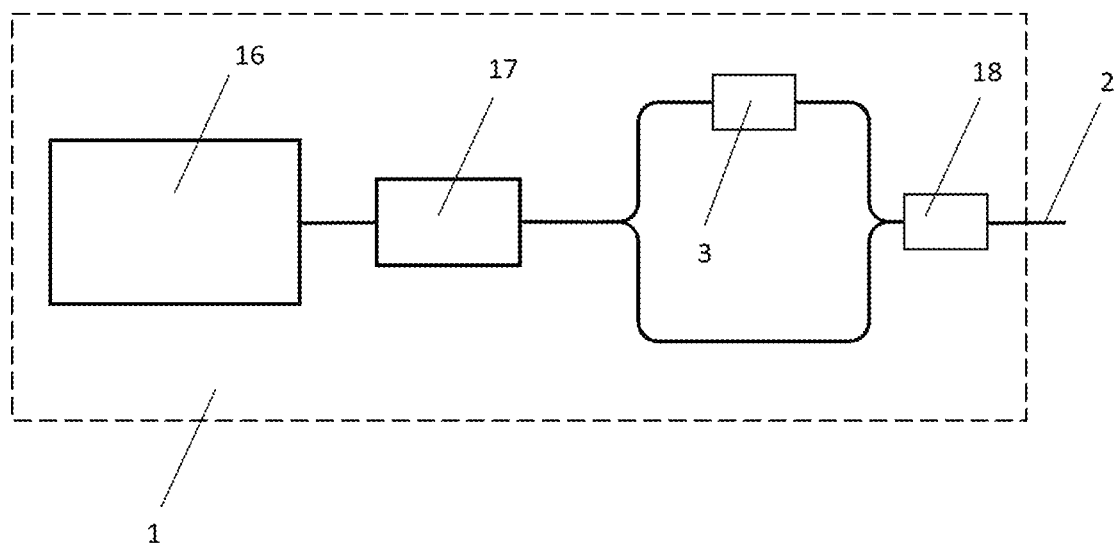

Exemplary embodiments of the invention are explained in more detail below with reference to the drawings. The figures show the following:

FIG. 1: schematic diagram of a laser device according to the invention with setting of the CE phase;

FIG. 2: laser device with setting of the CEO frequency and CE phase;

FIG. 3: laser device with control of the CE phase;

FIG. 4: laser device with control of the CE phase in two or more branches;

FIG. 5: laser device with integration of the optical modulator in the laser source.

The drawings are schematic. They show the optical setups of the exemplary embodiments as block diagrams, the illustration being limited to the components that are relevant to the invention. Conventional optical components are omitted for the sake of improved clarity, although these are necessary for the practical implementation of the exemplary embodiments.

The laser device illustrated in the figures has a laser source 1 in each case. The details of the laser source 1 are only illustrated in FIG. 5 for an exemplary embodiment that otherwise differs from the exemplary embodiments of FIGS. 1 to 4. It comprises e.g. a mode-locked erbium fiber laser 16 as an oscillator, which is stabilized in a conventional manner in terms of the pulse repetition frequency. This emits ultrashort optical pulses at a wavelength of 1.5 pm. The laser radiation is coupled into a highly nonlinear optical fiber 17. By means of the highly nonlinear fiber 17, a spectral continuum is generated which spans more than one optical octave (e.g. from approx. 0.86-1.86 pm) in the exemplary embodiment. The continuum is supplied to a difference-frequency generator 18. This is a suitable nonlinear crystal. The resulting spectrum at the output of the difference-frequency generator has spectral lines, the frequencies of which are equal to the differences of the frequencies of the spectral lines contained in the continuum at the edges thereof. By means of the difference-frequency generator, as a result, a spectrum in the form of a CEO-free frequency comb at the original wavelength of 1.5 pm is thus generated. Thus, the laser source 1 overall emits laser radiation 2 at its output with a spectrum in the form of a frequency comb, which is stabilized in terms of the pulse repetition frequency and the carrier-envelope frequency (fcEo=0).

Downstream of the laser source 1 in the radiation path in the exemplary embodiments of FIGS. 1 to 4 there is an acousto-optic modulator 3. This consists of a transparent medium, in which vibrations (ultrasound) in the form of a sound wave running through the medium are generated by means of a piezo oscillator 4. In principle, in a completely fiber-based implementation, an optical fiber acousto-optic modulator can also be used. The deflection of the light in the acousto-optic modulator 3 works on the principle of diffraction on an optical lattice. The optical lattice consists of the density fluctuations of the sound wave passing through the medium. The density fluctuations cause a periodic change in density in the medium and thus a periodic modulation of the refractive index. The laser radiation 5 leaving the acousto-optic modulator 3 in e.g. the first diffraction order has undergone a Doppler frequency shift at the frequency of the sound wave, i.e. the frequency of the control signal 6, with which the piezo oscillator 4 is controlled. The laser radiation 5 in FIGS. 1 and 2 is reflected at a retroreflector 7 and passes through the acousto-optic modulator 3 a second time in the reverse direction (double pass). Instead of the retroreflector 7, a curved mirror or a combination of lens and mirror could also be used. On passing through the acousto-optic modulator 3, the frequency shift by the frequency of the control signal occurs again. By means of a beam splitter 8, the laser radiation 9 that has thus been frequency-shifted twice is coupled out of the device and supplied to the desired application.

A control unit 10 is provided, which derives the control signal 6 from the laser radiation 2 emitted by the laser source 1. To this end, the laser radiation 2 is guided via the beam splitter 8 to a photodiode 11. At the output thereof, an electrical signal at the pulse repetition frequency of the laser source 1 is then present.

From this signal, in the exemplary embodiment of FIG. 2, by mixing in the mixer 12 with an offset frequency signal of adjustable frequency generated by the high frequency oscillator 13, the control signal 6 is generated at a frequency that is accordingly shifted relative to the pulse repetition frequency. In this case, the control signal 6 is phase-locked to the pulse train of the laser radiation 2.

The phase of the control signal 6 is set by means of a phase shifter 14. After amplification by means of a radio-frequency amplifier 15, the control signal 6 is then sent to the piezo oscillator 4. As a result, the spectral lines of the frequency comb shift in their optical frequency and thus the CEO frequency in the diffracted laser radiation 5, this shift being by the frequency of the control signal 6 owing to energy conservation.

At a frequency of the control signal 6, which in the exemplary embodiment of FIG. 1 equals the pulse repetition frequency of the laser source 1, i.e. without mixing with an offset frequency signal, the frequency comb is transposed into itself, which again gives fcEo=0. The shifting of the CE phase compared to the incoming laser radiation 2 is only dependent on the phase of the acoustic wave in the medium of the acousto-optic modulator 3. This can be controlled via the phase of the control signal 6, i.e. via the phase shifter 14. The bandwidth that can be achieved for setting the CE phase here is limited only by the switching speed of the acousto-optic modulator 3 and the electrical/electronic signal transmission delays. The phase shifter 14 can be controlled in synchronization with the laser pulse train, which allows the CE phase in the laser radiation 9 at the output of the device to be varied between freely predefinable values from laser pulse to laser pulse.

At a frequency of the control signal 6 which, in the exemplary embodiment of FIG. 2, is shifted relative to the pulse repetition frequency (or an integer multiple thereof) according to the frequency of the offset frequency signal, the frequency comb is not transposed into itself. Instead, the position of the spectral lines of the frequency comb in the laser radiation 9, i.e. after passing through the acousto-optic modulator 3, deviates from the original position (modulo free) according to the frequency offset (which is double in the double-pass arrangement of FIG. 1). In this way, the CEO frequency can be flexibly adjusted to a desired value. In other words, fcEo of the laser radiation 9 corresponds to twice (because of the double-pass arrangement) the difference between the frequency of the control signal 6, i.e. the modulation frequency of the acousto-optic modulator, and the pulse repetition frequency. The CE phase accordingly shifts by 2π fcEo/free from pulse to pulse. Depending on the setting of the phase shifter 14 and the resulting phase of the acoustic wave in the medium of the acousto-optic modulator 3, a constant, predefinable phase offset is additionally imprinted on the CE phase.

In the exemplary embodiment of FIG. 3 the laser radiation 2 passes through the acousto-optic modulator 3 only once. The radiation is coupled out at 5 after amplification in an erbium-doped fiber amplifier (EDFA) and spectral broadening in a highly nonlinear fiber (HNF). Part of the radiation is directed to a phase detector 19 (as close as possible to the particular application), which detects the CE phase of the laser pulse train (e.g. by spectrally resolved f-2f interferometry). The detected phase is supplied as a control variable to a controller 20, which in turn acts on the phase shifter 14 with a manipulated variable derived from the control variable, so as to stabilize the CE phase at the desired value or curve. The control allows fluctuations of the CE phase generated by external influences to be compensated. A control for fcEo can also be implemented in a corresponding manner.

In the exemplary embodiment of FIG. 4, the laser radiation 2 from the laser source 1 that is stabilized in terms of fcEo is first split into two or more branches, in each of which it passes through an arrangement 21, 21', etc. for setting and stabilizing the CE phase, which is set up as in FIG. 3. The CE phase (or CEO frequency) of the output radiation 5, 5', etc. can be stabilized at a different nominal value in each case. The output radiations 5, 5', etc. can finally be superposed again in a single beam, with a different time delay in each case, thus resulting in a laser pulse train in which the consecutive pulses cycle through the CE phase values set in the individual branches 21, 21', etc. Alternatively, the output radiation 5, 5' can be combined with a further output beam 22 in a difference generator.

In the exemplary embodiment of FIG. 5, the laser source 1 comprises the mode-locked oscillator 16, of which the pulsed laser radiation is first split into two separate radiation paths after the spectral broadening in the highly nonlinear fiber 17. The acousto-optic modulator 3 is located in the upper of the two radiation paths. The acousto-optic modulator 3 is therefore integrated in the laser source 1, unlike the exemplary embodiments of FIGS. 1 to 4. The generation of the control signal by detection of the pulse repetition frequency is not shown in FIG. 5. In principle, it can take place as illustrated in FIGS. 1 to 4, the control signal being derived in a suitable manner from the laser radiation of the mode-locked oscillator 16 (or from its electronic control system). In the difference-frequency generator 18, the laser radiation supplied via the two radiation paths is recombined. The acousto-optic modulator 3 only shifts the phase and/or frequency of the laser radiation propagating along the upper radiation path. By means of difference frequency generation, the CEO frequency is stabilized in principle, as described above. The phase and/or frequency imprinted by the acousto-optic modulator 3 in the one radiation path is, however, maintained in the difference frequency generation in the laser radiation 2 leaving the laser source 1. The difference-frequency generator 18 only compensates the (non-stabilized) portion of the CE phase or frequency in the radiation emitted by the oscillator 16. Thus, the acousto-optic modulator 3—by the same principle as in FIGS. 1 to 4—causes a CE phase and/or CEO frequency setting of the stabilized laser radiation 2. Alternatively, a setting of the CEO frequency of the laser radiation 2 is also possible by incrementing the CE phase from laser pulse to laser pulse by means of the acousto-optic modulator 3. For the difference frequency generation, it can be expedient in the exemplary embodiment of FIG. 5 to provide a spectral separation in the splitting of the laser radiation into the two beam paths (not illustrated), wherein e.g. only a long-wave portion of the spectrum passes along the one radiation path and only a short-wave portion of the spectrum passes along the other radiation path.

The invention claimed is:

1. A laser device comprising:
    a laser source, which is configured to emit pulsed laser radiation with a spectrum in the form of a frequency comb having a plurality of equidistant spectral lines, which laser radiation emitted by the laser source is stabilized in terms of a carrier envelope frequency,
    an optical modulator, which is configured to shift at least one of a phase of the pulsed laser radiation and a frequency of the pulsed laser radiation, and
    a control unit, which is configured to control the optical modulator by means of a control signal, wherein the control unit is further configured to set a phase of the control signal and thus to adjust a carrier envelope phase of the pulsed laser radiation to a pre-determinable value, and wherein the control unit is further configured to increment the phase of the control signal by a predefined value from laser pulse to laser pulse to set the carrier envelope frequency of the laser radiation.

2. The laser device according to claim 1, wherein the pulsed laser radiation emitted by the laser source is also stabilized in terms of a pulse repetition frequency.

3. The device according to claim 1, wherein the optical modulator is an acousto-optic modulator, wherein the control signal excites an acoustic wave in the medium of the acousto-optic modulator.

4. The device according to claim 3, wherein the control unit is configured to generate the control signal as a radio-frequency signal at the pulse repetition frequency of the pulsed laser radiation or an integer multiple thereof.

5. The device according to claim 3, wherein the control unit is configured to generate the control signal as a radio-frequency signal at a carrier envelope frequency shifted by a pre-definable frequency offset relative to a pulse repetition frequency of the pulsed laser radiation or an integer multiple thereof.

6. The device according to claim 1, wherein the carrier envelope frequency of the pulsed laser radiation emitted by the laser source equals zero.

7. The device according to claim 1, wherein the laser source further comprises:
    a mode-locked oscillator,
    two separate radiation paths for the pulsed laser radiation emitted by the mode-locked oscillator, wherein the optical modulator is located in one of the two radiation paths, and
    a difference-frequency generator, in which the pulsed laser radiation supplied via the two radiation paths is superposed.

8. A method of generating an optical frequency comb, comprising the steps of:
    generating pulsed laser radiation with a spectrum in the form of a frequency comb having a plurality of equidistant spectral lines, which laser radiation is stabilized in terms of a carrier envelope frequency, and
    shifting a phase and/or a frequency of the pulsed laser radiation according to a control signal,
    wherein the carrier envelope frequency of the pulsed laser radiation is set by means of an acousto-optical modulator, by phase adjustment of the control signal including incrementing the phase of the control signal by a predefined value from laser pulse to laser pulse.

9. The method according to claim 8, wherein the carrier envelope frequency of the pulsed laser radiation is shifted by a pulse repetition frequency or an integer multiple thereof.

10. The method according to claim 8, wherein the carrier envelope frequency of the pulsed laser radiation is shifted by a frequency that differs from a pulse repetition frequency or an integer multiple thereof by a frequency offset.

* * * * *